United States Patent [19]

Germann et al.

[11] Patent Number: 5,851,014
[45] Date of Patent: Dec. 22, 1998

[54] SLIDE RING SEAL ASSEMBLY FOR THE RUNNING GEARS OF TRACK-LAYING VEHICLES

[75] Inventors: Erwin Germann, Aichach; Lothar Neureuter, Friedberg; Hans-Henning Zutz, Wermelskirchen; Hans-Jürgen Veutgen, Burscheid, all of Germany

[73] Assignee: A E Goetze GmbH, Burscheid, Germany

[21] Appl. No.: 679,924

[22] Filed: Jul. 15, 1996

[30] Foreign Application Priority Data

Jul. 15, 1995 [DE] Germany ............... 195 25 863.0

[51] Int. Cl.$^6$ .................................................. F16J 15/34
[52] U.S. Cl. ..................................... 277/406; 277/940
[58] Field of Search ............................. 277/96.2, 216, 277/DIG. 6, 404, 406, 434, 443, 940

[56] References Cited

U.S. PATENT DOCUMENTS

| | | | |
|---|---|---|---|
| Re. 31,482 | 1/1984 | Noble ..................... | 164/114 |
| 2,841,488 | 7/1958 | Morrogh ................. | 75/123 |
| 3,452,995 | 7/1969 | Engelking .............. | 277/92 |
| 3,658,451 | 4/1972 | Gomada ................. | 277/81 P |
| 3,677,558 | 7/1972 | Sugahara . | |
| 4,080,198 | 3/1978 | Heyer et al. ........... | 75/125 |
| 4,094,514 | 6/1978 | Johnson ................. | 277/92 |
| 4,253,435 | 3/1981 | McCandless ........... | 277/216 |
| 4,271,239 | 6/1981 | Warner et al. ......... | 428/547 |
| 4,435,226 | 3/1984 | Neuhauser et al. .... | 148/3 |
| 4,531,985 | 7/1985 | Tommis .................. | 148/16.6 |
| 4,548,643 | 10/1985 | Betts ...................... | 75/124 |
| 4,702,886 | 10/1987 | Kent ....................... | 420/18 |
| 4,948,437 | 8/1990 | Metzler .................. | 148/138 |
| 4,961,791 | 10/1990 | Metzler et al. ........ | 148/2 |
| 5,032,194 | 7/1991 | Metzler .................. | 148/321 |
| 5,242,510 | 9/1993 | Begin ..................... | 148/321 |
| 5,423,664 | 6/1995 | Iizuka et al. ........... | 418/179 |
| 5,669,680 | 9/1997 | Bertoni .................. | 305/119 |
| 5,678,753 | 10/1997 | Stauder .................. | 228/225 |

FOREIGN PATENT DOCUMENTS

| | | | |
|---|---|---|---|
| 0 411 244 | 2/1991 | European Pat. Off. . | |
| 2456700 | 8/1976 | Germany . | |
| 3147461 | 6/1983 | Germany . | |
| 33 11 185 | 9/1984 | Germany . | |
| 8915632 | 1/1991 | Germany . | |
| 6-221436 | 8/1994 | Japan ..................... | 277/216 |
| 1482724 | 8/1977 | United Kingdom . | |
| 1506947 | 4/1978 | United Kingdom . | |

*Primary Examiner*—Anthony Knight
*Assistant Examiner*—John L. Beres
*Attorney, Agent, or Firm*—Venable

[57] ABSTRACT

In a slide ring seal assembly having slide rings comprised of a casting material for running gears of track-laying vehicles and construction machinery, the improvement being slide rings composed of a gray cast iron alloy having a pearlitic matrix structure having lamellar separation of graphite therein, having a hardness value of at least 110 HRB, and being composed of:

2.99 weight percent of carbon;
4.61 weight percent of silicon;
0.77 weight percent of manganese;
0.53 weight percent of phosphorus;
0.039 weight percent of sulfur;
1.7 weight percent of chromium;
0.81 weight percent of vanadium;
1.86 weight percent of copper; and
iron as remainder.

3 Claims, No Drawings

SLIDE RING SEAL ASSEMBLY FOR THE RUNNING GEARS OF TRACK-LAYING VEHICLES

CROSS-REFERENCE TO RELATED APPLICATION

The present disclosure relates to the subject matter disclosed in Application No. 195 25 863.0 filed in Germany on Jul. 15, 1995, the entire specification of which is incorporated herein by reference.

BACKGROUND OF THE INVENTION

1. Field of the Invention

The invention relates to a slide ring seal assembly having slide rings for the running gears of track-laying vehicles and construction machinery, the slide rings being made of a casting material, such as a cast iron, and to use of the casting material for the manufacture of packing rings or piston rings for combustion engines or fittings, and for the manufacture of cylinder liners made by gravity (vertical) casting or centrifugal casting.

2. Background of the Related Art

A slide ring seal assembly of the above type is disclosed, for example, in U.S. Pat. No. 3,452,995, the disclosure of which is incorporated herein by reference. According to this Patent, a slide ring and a counterring are urged toward one another by radially essentially aligned elastomer sealing rings (O-rings) clamped between conical surfaces belonging to the slide ring and the counterring, respectively.

During their operation, running gears of track-laying vehicles and construction machinery experience severe wear stresses primarily due to exposure to dust, sand, mud and earth. To provide protection against such highly corrosive and abrasive stresses, it is crucial that particularly the bearings of the support rollers, running rollers and deflection rollers of track-laying machinery and the hubs and axles of wheeled running gears be sealed with seals. The seals used are preferably slide ring seals, in which two metallic slide rings of identical dimensions are elastically seated in circular rubber rings situated approximately in radial alignment, and run on top of one another while being pressed (urged) axially toward one another by the rubber rings. The running surfaces of the slide rings are lapped.

Corresponding to the highly abrasive and corrosive stresses during operation, appropriately wear-resistant materials are used for the slide rings. These primarily include hard casting materials made of stellites and nickel-containing, ledeburitically solidified, white cast iron alloys. The great hardness of these cast materials, however, only permits further processing of the rings by grinding. Therefore, in order to minimize costly grinding work, the rings must be cast as true to form as possible by complicated casting methods which increase costs. Stellites and cast iron alloys containing high amounts of nickel also contain high proportions of costly non-iron metallic alloy additives.

Less expensive rings may be made of chrome steels by drop forging or compression molding. But here, too, the finishing of the ring blanks is only possible by means of expensive grinding so that, for less expensive rings, expensive grinding is typically dispensed with in order to minimize the production costs and defects in quality are deliberately accepted.

It is therefore an object of the invention to provide slide ring seal assemblies, for the running gears of track-laying vehicles and construction machinery, having slide rings which are comprised of a casting material which is a cast iron and which are sufficiently resistant to abrasive and corrosive wear while manufacturing is simple and economical.

It is a further object of the invention to use the foregoing cast iron for the manufacture of packing rings or piston rings for combustion engines or fittings, and for the manufacture of cylinder liners made by gravity (vertical) casting or centrifugal casting.

SUMMARY OF THE INVENTION

These and other objects are accomplished according to the invention in which, in a slide ring seal assembly having slide rings comprised of a casting material for the running gears of track-laying vehicles and construction machinery, the improvement comprises slide rings comprised of a gray cast iron alloy which has a pearlitic matrix structure having lamellar separation of graphite therein and which is comprised of:

from about 2.0 to about 4.0 weight percent of carbon;
from about 1.5 to about 6.0 weight percent of silicon;
from about 0.2 to about 2.5 weight percent of manganese;
from about 0.0001 to a maximum of about 2.00 weight percent of phosphorus;
from about 0.0001 to a maximum of about 0.15 weight percent of sulfur;
from about 0.2 to about 4.0 weight percent of chromium;
from about 0.05 to about 3.0 weight percent of vanadium;
from about 0.05 to about 4.0 weight percent of copper; and
iron as remainder.

The gray cast iron is advantageously an alloy and may advantageously further comprise from about 0.0001 up to a maximum of about 8 weight percent in total of at least one element selected from the group consisting of nickel, cobalt, molybdenum, tungsten, aluminum, tin, bound nitrogen, titanium, niobium, tantalum, and boron. The slide rings may advantageously be treated slide rings selected from the group consisting of slide rings which are tempered in a tempering treatment at a maximum temperature of 750° C. and slide rings which are quench hardened in a quenching treatment from a maximum temperature of 1050° C. At least a portion of the slide rings may advantageously be nitrided or nitrocarburized by any of several known methods. Preferably the entire surface of the slide rings are nitrided or nitrocarburized.

The foregoing gray cast iron may be utilized to manufacture a combustion engine packing ring, a combustion engine piston ring, a fitting for a combustion engine packing ring, and a fitting for a combustion engine piston ring. The foregoing gray cast iron may additionally be utilized to manufacture an engine cylinder liner, which liner is a gravity (vertical) casting or a centrifugal casting.

With the gray cast iron alloy according to the invention, slide ring blanks for the slide ring seal assemblies were cast and finished to form slide rings. The slide rings were assembled to form slide ring seal assemblies and tested in bench test runs.

The results of the tests demonstrated particular advantages as follows.

The resulting cast iron structures of the blanks were uniform gray cast structures even if difficult casting geometries were employed.

Due to their hardness between approximately 100 and 120 HRB, it was possible to remove metal from the ring blanks, such as by machining the ring blanks, without any problems and at little cost so that complicated forming processes during casting could be dispensed with.

Due to their carbon content, particularly their graphite content, the rings showed decreased wear in a dry run wear test of over 1,000 hours compared to conventional slide rings.

The rings did not show any visible corrosive and abrasive wear in a 1,000 hour test on a muddy water test is bench and, thus, their wear behavior corresponded approximately to that of conventional, commercially available rings.

The invention thus provides slide rings for a slide ring seal assembly for the running gears of track-laying vehicles and construction machinery, which can be produced in a simple and economical manner while being sufficiently resistant to abrasive and corrosive wear.

Further tests demonstrated that the gray cast iron may be an alloy and may additionally comprise at least one of the elements nickel, cobalt, molybdenum, tungsten, aluminum, tin, bound nitrogen, titanium, niobium, tantalum and boron in amounts of 8 weight percent at maximum to further increase the wear resistance of the alloy.

To increase wear resistance, the rings may additionally be subjected to a tempering treatment at a maximum temperature of 750° C. and/or to quench hardening from a maximum temperature of 1050° C.

Because of its chromium content, the gray cast iron material according to the invention is very well suited for nitriding or nitrocarburizing structures made therefrom, and it was found that its abrasive and corrosive wear resistance can be significantly increased in any of the several conventional nitriding or nitrocarburizing processes including, by way of example but not limitation, bath nitriding (i.e., nitriding in a chemical bath), gas nitriding (i.e., nitriding in a reactive gas), plasma nitriding (i.e., nitriding in a plasma), and pulsed-plasma nitriding (i.e., nitriding in a pulsed plasma).

Advantageously, it is also possible to use the gray cast iron alloy employed according to the invention for the production of further seals in mechanical engineering and for combustion engines, such as seal packings or small to large piston rings, as well as for the production of cylinder liners made by known gravity (vertical) casting or centrifugal casting methods.

DESCRIPTION OF THE PREFERRED EMBODIMENTS

The invention is explained in greater detail by way of the following example.

Slide ring blanks for slide ring seal assemblies for running gears made of a cast iron alloy were cast using the sand casting method. The cast iron alloy was composed of:

2.99 weight percent of carbon;
4.61 weight percent silicon;
0.77 weight percent manganese;
0.53 weight percent phosphorus;
0.039 weight percent sulfur;
1.7 weight percent chromium;
0.81 weight percent vanadium;
1.86 weight percent copper; and
iron as remainder.

The cast structure of the rings was pearlitic with a uniformly distributed lamellar separation of graphite. The hardness of the rings was 110 HRB.

The ring blanks were finished by turning the circumferential surfaces thereof on a lathe and by lapping the running surfaces.

In the assembled state, the slide rings had wear values in a 1,000 hour muddy water bench test and in a 1,000 hour dry run wear test which approximately corresponded to the values for conventional rings made from stellites, nickel chill-cast iron alloys, and chrome steels.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. In a slide ring seal assembly having slide rings comprised of a casting material for running gears of track-laying vehicles and construction machinery, the improvement comprising:

slide rings comprised of a gray cast iron alloy having a pearlitic matrix structure having lamellar separation of graphite therein, having a hardness value of at least 110 HRB, and being comprised of:

2.99 weight percent of carbon;
4.61 weight percent of silicon;
0.77 weight percent of manganese;
0.53 weight percent of phosphorus;
0.039 weight percent of sulfur;
1.7 weight percent of chromium;
0.81 weight percent of vanadium;
1.86 weight percent of copper; and
iron as remainder.

2. The slide ring seal assembly according to claim 1, wherein the slide rings are treated slide rings selected from the group consisting of slide rings which are tempered in a tempering treatment at a maximum temperature of 750° C. and slide rings which are quench hardened in a quenching treatment from a maximum temperature of 1050° C.

3. The slide ring seal assembly according to claim 1, wherein at least a portion of the slide rings are nitrided or nitrocarburized.

* * * * *